United States Patent
Pourian et al.

(10) Patent No.: US 10,896,348 B2
(45) Date of Patent: Jan. 19, 2021

(54) END TO END FRAMEWORK FOR GEOMETRY-AWARE MULTI-SCALE KEYPOINT DETECTION AND MATCHING IN FISHEYE IMAGES

(71) Applicant: Intel Corporation, Santa Clara, CA (US)

(72) Inventors: Niloufar Pourian, Los Gatos, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 16/261,153

(22) Filed: Jan. 29, 2019

(65) Prior Publication Data

US 2019/0156145 A1    May 23, 2019

(51) Int. Cl.
    *G06K 9/62*    (2006.01)
    *G06T 7/00*    (2017.01)
    *G06T 7/33*    (2017.01)

(52) U.S. Cl.
    CPC .......... *G06K 9/6211* (2013.01); *G06K 9/6215* (2013.01); *G06T 7/0002* (2013.01); *G06T 7/33* (2017.01); *G06T 7/97* (2017.01); *G06T 2207/10024* (2013.01)

(58) Field of Classification Search
    CPC ...... G06K 9/00624; G06K 9/209; G06K 9/46; G06K 9/6211; G06K 9/6215; G06K 9/6276; G06T 2207/10024; G06T 7/0002; G06T 7/33; G06T 7/97
    See application file for complete search history.

(56) References Cited

U.S. PATENT DOCUMENTS

2019/0236805 A1*  8/2019  Mou ............... G06K 9/6211

OTHER PUBLICATIONS

Alcantarilla, P.F. et al., "KAZE features", European Conference on Computer Vision (ECCV); Springer, Berlin, Heidelberg; pp. 214-227; 2012.
Altwaijry, H. et al., "Learning to Detect and Match Keypoints with Deep Architectures", BMVC; 2016.
Beardsley, P. et al., "3D model acquisition from extended image sequences", European Conference on Computer Vision, Berlin 1996.
Dalal, et al., "Histograms of Oriented Gradients for Human Detection", IEEE Computer Society Conference on Computer Vision and Pattern Recognition, 2005. CVPR 2005.
Fischler, M. et al., "Random Sample Consensus: A Paradigm for Model Fitting with Applications to Image Analysis and Automated Cartography", Communications of the ACM; vol. 24, No. 6, Jun. 1981, pp. 381-395.
Furnari, et al., "Affine covariant features for fisheye distortion local modeling", IEEE Transactions on Image Processing; 2017.

(Continued)

*Primary Examiner* — Manuchehr Rahmjoo
(74) *Attorney, Agent, or Firm* — Green, Howard & Mughal LLP.

(57) ABSTRACT

Techniques related to feature detection and matching fisheye images are discussed. Such techniques include determining a geometric constraint for the feature matching using match results from a first image based feature matching and generating resultant matches based on applying the geometric constraint and a second image based feature matching that applies a looser image based feature matching requirement than the image based feature matching.

22 Claims, 8 Drawing Sheets

(56) References Cited

OTHER PUBLICATIONS

Furnari, et al., "Affine region detectors on the fisheye domain", IEEE International Conference on Image Processing (ICIP); 2014.

Gava, et al., "Robust Guided Matching and Multi-layer Feature Detection Applied to High Resolution Spherical Images", VISAPP (2); 2013.

Han, X. et al., "Matchnet: Unifying feature and metric learning for patch-based matching", IEEE Conference on Computer Vision and Pattern Recognition; pp. 3279-3286; 2015.

Hansen, et al., "Wde-angle visual feature matching for outdoor localization", The International Journal of Robotics Research; 2010.

Harris, C. et al., "A combined corner and edge detector", Alvey Vision Conference; pp. 147-152;1988.

Huang, et al., "Image completion using planar structure guidance", ACM Transactions on graphics (TOG); 33.4 (2014): 129.

Leutenegger, et al., "BRISK: Binary robust invariant scalable keypoints", IEEE International Conference on Computer Vision (ICCV); 8 pages; 2011.

Lourenco, et al., "sRD-SIFT: Keypoint detection and matching in images with radial distortion", IEEE Transactions on Robotics; 2012.

Lowe, D.G., "Object recognition from local scale-invariant features", International Conference on Computer Vision, Corfu, Greece, pp. 1150-1157; 1999.

Lowe, D.G., "Distinctive Image Features from Scale-Invariant Keypoints", International Journal of Computer Vision, 2004, pp. 1-28.

Matas, J. et al., "Robust wide-baseline stereo from maximally stable extremal regions", Image and vision computing; 10 pages; 2004.

Rublee, E. et al., "ORB: An efficient alternative to SIFT or SURF", IEEE International Conference on Computer Vision (ICCV); 8 pages; 2011.

\* cited by examiner

END TO END FRAMEWORK FOR GEOMETRY-AWARE MULTI-SCALE KEYPOINT DETECTION AND MATCHING IN FISHEYE IMAGES

BACKGROUND

In some contexts, it is desirable to perform feature detection and matching across different images of a scene such that the images are taken using fisheye cameras equipped with ultra-wide field of view fisheye lenses (e.g., 220 degree fisheye lenses). For example, matched keypoints between fisheye images may be used for dynamic calibration, image stitching, view interpolation, structure from motion, etc.

Notably, most traditional keypoint detection and matching algorithms are designed to perform well on sparse feature matching in rectilinear perspective images. However, fisheye images typically suffer from a strong visual distortion that adversely affects the performance of such matching schemes. Furthermore, in traditional approaches, increasing the number of true positives in the matching process is typically coupled with increased number of false positives. However, having a large number of matched keypoints is critical for many computer vision applications as more observations allow better modeling of various application parameters. Difficulties persist in attaining a large number of true matched keypoints in images captured using fisheye lenses.

Therefore, current techniques are inadequate for performing high quality and/or efficient feature detection and matching of images from ultra-wide field of view fisheye lenses. It is with respect to these and other considerations that the present improvements have been needed. Such improvements may become critical as the desire to generate and manipulate content from such fisheye lenses for use in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
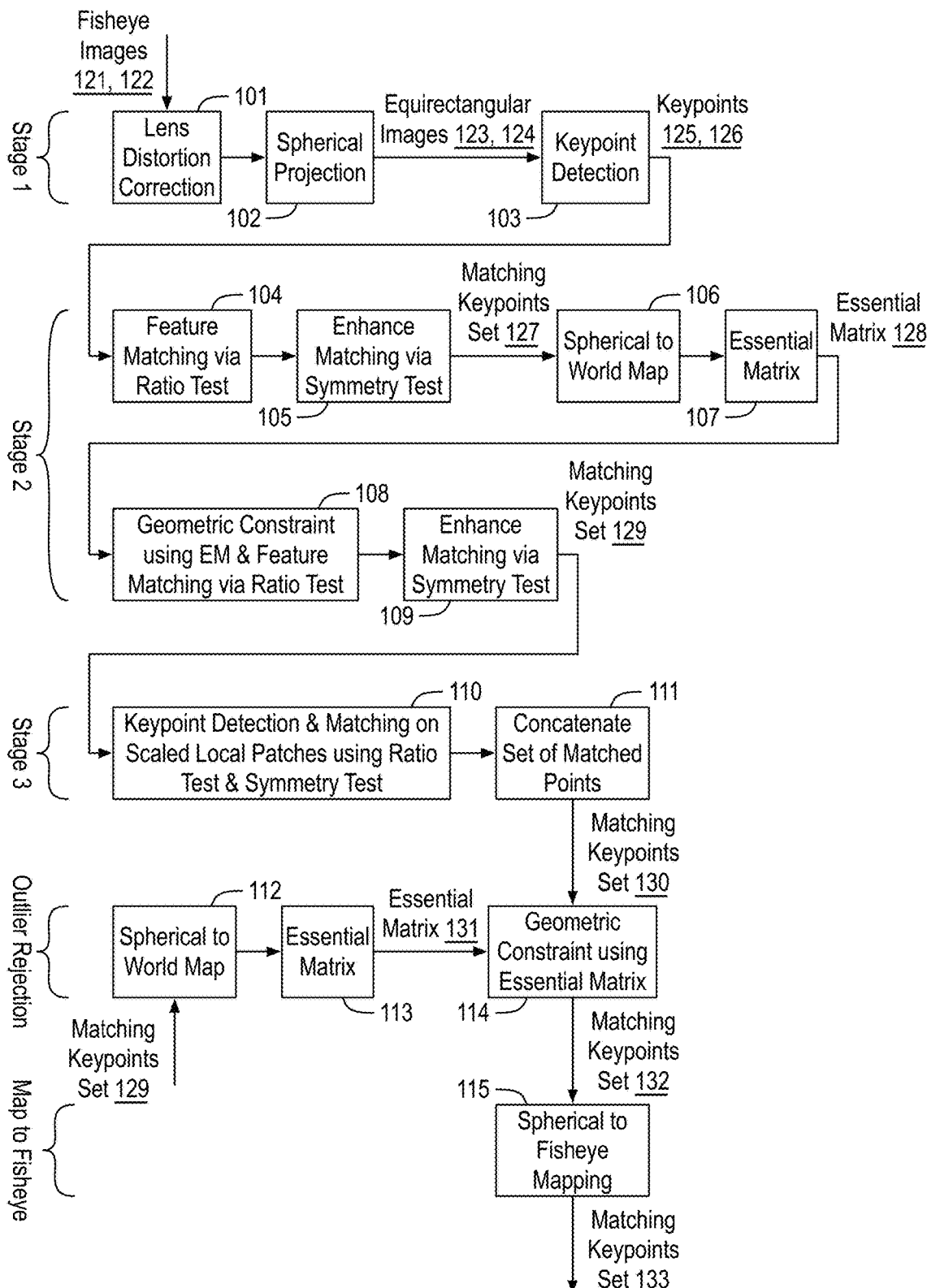
FIG. 1 illustrates an example system for keypoint detection and matching in fisheye images of a scene.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein. The terms "substantially," "close," "approximately," "near," and "about," generally refer to being within +/−10% of a target value.

Methods, devices, apparatuses, computing platforms, and articles are described herein related to feature detection and matching in images corresponding to fisheye images of a scene and, in particular, to using initial image based feature matches to define geometric constraints for subsequent geometric and image based feature matching of detected features.

As described above, in some contexts, it is desirable to detect and match features in images corresponding to fisheye images of a scene. Notably, matched sets of features or feature points as defined by a data structure that indicates corresponding features or points (e.g., a data set having pixel locations of matched features or points) are required in a variety of image processing and/or computer vision contexts such as dynamic calibration, image stitching, view interpolation, structure from motion, etc. For example, given two corresponding fisheye images taken across different views of the same scene, it is valuable to determine matched sets of features or feature points between the two fisheye images. In some embodiments, the corresponding data structure of such matched sets of features or feature points include a pixel location of a feature or feature point in the first of the fisheye images and a pixel location of a matched feature or feature point in the second of the fisheye images.

In some embodiments, keypoint detection and matching in fisheye images includes attaining feature point or keypoint correspondences between equirectangular images that correspond to neighboring fisheye images of a scene. As used herein the term fisheye image indicates an image captured or generated based on a fisheye view of a scene (e.g., using or corresponding to a fisheye lens having a field of view of not less than 180 degrees). A fisheye image may also be characterized as a spherical image. The fisheye image may be in any suitable format or projection format. The term equirectangular image indicates a projection from the fisheye image onto an equirectangular image plane and the equirectangular image may also be in any suitable format. The feature point or keypoint correspondences between the equirectangular images and/or between the fisheye images includes a keypoint mapping between keypoints of two images of the same scene. As used herein, the terms feature point and keypoint are used interchangeably and indicate a location of a feature within an image. The term feature indicates an image based (e.g., visual) feature discerned from the image such as SIFT (scale-invariant feature transform) features generated using pixel values at particular locations of the image. Each keypoint correspondence includes a keypoint mapping (e.g., indicating keypoints between images are deemed to be of the same feature) between first and second images of a scene.

Such keypoint correspondences are generated by determining a first set of matching keypoint correspondences between first and second equirectangular images such that the first and second equirectangular images represent projections of separate fisheye images of a scene. For example, the equirectangular images may be generated by mapping the fisheye images to the equirectangular images using a spherical projection. The first set of matching keypoint correspondences are generated using any suitable technique or techniques, such as image based feature matching, that uses a relatively tight image based constraint (e.g., threshold) to provide high confidence matches (e.g., more true positives at risk of losing false negatives). The matching keypoints of the first set are then mapped to a world coordinate system corresponding to the scene and, based on the matching keypoints in the world coordinate system, an essential matrix is generated. Notably, the essential matrix is generated using the high confidence keypoint matches. However, the number of such keypoint matches is low and insufficient for many applications.

The essential matrix is then used to define a geometric constraint that is applied, along with another image based feature matching, to generate a second set of keypoint correspondences between the first and second equirectangular images. In some embodiments, the image based feature matching used with the geometric constraint (e.g., as applied using a geometric matching test that uses the essential matrix as discussed further herein) is the same image based feature matching technique used to generate the first set of matching keypoint correspondences with application of a looser constraint (e.g., threshold). Thereby, the second set of keypoint correspondences may include more matches such that each match passes the geometric constraint and the second image based feature matching constraint. Other constraints, such as a symmetry constraint may also be applied.

The resultant second set of keypoint correspondences may be transmitted for use and/or supplemented. As used herein the term transmit (or provide or send, etc.) for use indicates preparing or storing the corresponding data for later presentment, sending the data for storage, providing the data to another application, transferring the data to another device, etc. In addition or in the alternative, the second set of keypoint correspondences may be used to define local patches for local search. As used herein, the term patch indicates a portion of an entire image typically much smaller than the image (0.05% to 0.2% of the image area). That is, local image regions around the keypoints may be searched for yet additional matches. Furthermore, the second set of keypoint correspondences may be used to define a second essential matrix (e.g., more robust and/or accurate than the first). The additional matches may then be subjected to a geometric constraint as provided by the second essential matrix (e.g., each match would need to satisfy the second essential matrix or be discarded). The resultant matches (e.g., the second set of keypoint correspondences and the additional local search matches that satisfy the second essential matrix) may then be transmitted for use as discussed above.

The techniques discussed herein provide an end-to-end framework for feature detection and matching in fisheye images that enhances both precision and recall in the matching process (e.g., increasing the number of correct matches across the fisheye images while reducing the number of false positive matches). Radial distortion in fisheye images is reduced or eliminated while the wide field of view (FOV) that is present in fisheye images is not sacrificed. A geometry-aware feature matching is used (via application of an essential matrix constraint) for the fisheye images along with image based feature matching and a symmetry test to improve feature matching performance. Furthermore, a second level (local) detection and matching process is performed on local patches defined based on the scale and position of the resultant global matches with the combination of global and local matches allowing the determination of a larger number of matches with high precision. In addition to superior performance, the techniques discussed herein are adaptable to any supervised or unsupervised keypoint detector and/or feature descriptor. As noted above, variety of applications, including computer vision applications that analyze multi-view images captured by fisheye multi-camera systems, require abundant and accurate feature matches. Examples include dynamic calibration, image stitching, view interpolation, structure from motion, etc. The discussed techniques and systems are a key component of multi-fisheye camera applications and may be integrated as part of a tracking system in fisheye multi-camera systems used in surveillance or automotive surround camera systems, applied in 360 camera array contexts for immersive VR content, in multi-drone systems for image stitching, etc.

FIG. 1 illustrates an example system 100 for keypoint detection and matching in fisheye images of a scene, arranged in accordance with at least some implementations of the present disclosure. As shown in FIG. 1, system 100 includes a lens distortion correction module 101, a spherical projection module 102, a keypoint detection module 103, a feature matching module 104 (e.g., feature matching via ratio test), a matching enhancement module 105 (e.g., enhance via symmetry test), a spherical to world mapping module 106, an essential matrix prediction module 107, a geometric and feature matching module 108 (e.g., geometric constraint using essential matrix, EM, and feature matching via ratio test), a matching enhancement module 109 (e.g., enhance via symmetry test), a keypoint detection and matching using local search module 110 (e.g., keypoint detection and matching on scaled local patches using ratio test and symmetry test), a concatenation module 111 (e.g., concatenate set of matched points), a spherical to world mapping module 112, an essential matrix prediction module 113, a geometric matching module 114, (e.g., geometric constraint using essential matrix), and a spherical to fisheye mapping module 115.

As shown, such modules or components may be implemented in three main stages. A first stage transforms fisheye images to equirectangular projection images and uses approximate intrinsic calibration parameters of the cameras or conditions used to attain the fisheye images to remove radial distortion present in the fisheye images. The first stage also performs independent keypoint detection on the equirectangular projection images. Notably, such processing is performed independently on each of at least two corresponding images. In the second stage, global keypoint matching is performed to generate a set of matching keypoints between the two images. In the second stage, geometric information is integrated with visual similarity cues into the feature matching for the equirectangular images to improve the precision of feature matching. In the third stage, both precision and recall are again improved through a localized matching scheme by focusing on keypoint detection and feature matching at a local patch level. The patches are dynamically defined by the scale and the location of the matched features from the second stage. This allows a closer look at the surroundings of points that are already found to be matches. By limiting the feature matching to corresponding patches, the search space is significantly reduced, allowing a denser feature matching while not introducing large number of false positives. At final stages, outliers of the local keypoints are rejected and the matching keypoints are mapped to the fisheye images.

System 100 attains fisheye images 121, 122 of a scene and ultimately generates a set of matching keypoints 133 indicating matching keypoints between fisheye images 121, 122. In an embodiment, fisheye cameras (not shown) of system 100, capture two or more fisheye images of a scene. Although illustrated with respect to two fisheye images 121, 122, keypoint matching may be performed between adjacent ones of any number of fisheye images. System 100 may be implemented in any suitable form factor device such as a personal computer, a laptop computer, a tablet, a phablet, a smart phone, a digital camera, a gaming console, a wearable device, a display device, a virtual reality headset, etc. For example, system 100 may perform keypoint detection and matching for fisheye images as discussed herein. In some embodiments, in addition or in the alternative to attaining images from fisheye cameras, system 100 may attain fisheye images 121, 122 from memory, another device, a rendering engine, etc.

As shown, fisheye images 121, 122 are received by lens distortion correction module 101, in which fisheye images 121, 122 go through a lens distortion correction based on characteristics of the cameras used to attain fisheye images 121, 122. For example, lens distortion correction module 101 may modify fisheye coordinates of fisheye images 121, 122 using a lens distortion correction function based on intrinsic parameters of the cameras used to attain fisheye images 121, 122. The resultant lens distortion corrected coordinates are provided to spherical projection module 102. Spherical projection module 102 maps the resultant 3D world points or coordinates to equirectangular images to generate equirectangular images 123, 124. In an embodiment, fisheye image 121 corresponds to equirectangular image 123 and fisheye image 122 corresponds to equirectangular image 124. Such projection of fisheye images 121, 122 to equirectangular images 123, 124 as completed by modules 101 and 102 takes away the radial distortion in fisheye images while not sacrificing the wide FOV covered by fisheye images. Notably, each pixel of fisheye images 121, 122 thereby includes color information or luma and color information (e.g., RGB channels, YUV channels, etc.) and spatial information (e.g., 2 coordinates indicating the pixel location when projected onto a surface of a sphere). Such techniques are favorable as radial distortion adversely affects the performance of keypoint detection and feature matching. As discussed, fisheye coordinates initially go through a lens distortion correction function using known camera intrinsic parameters and are mapped to the 3D world points. This allows removal of radial distortion present in the fisheye images. This is followed by mapping the 3D world coordinates to equirectangular images using spherical projections which allows not to sacrifice the wide FOV covered by fisheye images.

Figure 2:
FIG. 2 illustrates example corresponding fisheye images and example corresponding equirectangular images.

FIG. 2 illustrates example corresponding fisheye images 121, 122 and example corresponding equirectangular images 123, 124, arranged in accordance with at least some implementations of the present disclosure. As shown, fisheye images 121, 122 contain image content on a fisheye image plane, which may be reprojected onto an equirectangular image plane to generate equirectangular images 123, 124. Notably, fisheye images 121, 122 cover different views of a same scene, as do reprojected equirectangular images 123, 124. Although illustrated with respect to two fisheye images 121, 122 of an indoor scene, any number of pairs of fisheye images may be processed using the techniques discussed herein and any suitable scene may be imaged.

Returning to FIG. 1, equirectangular images 123, 124 are provided to keypoint detection module 103. Keypoint detection module 103 performs keypoint detection separately on each of equirectangular images 123, 124 using any suitable technique or techniques to detect any suitable image based features. As shown, such features are indicated using keypoint data 125. As used herein, the term image based featured detection indicates feature detection based on features extracted using only image information (e.g., luma pixel values and/or color pixel values). The extracted features may be any suitable features such as SIFT features, features detected using convolutional neural networks, features based on scale-space extrema in the difference-of-Gaussian function convolved with the image, etc. Keypoint data 125, 126 may include any suitable data or data structure indicating the detected features or keypoints such as a location and feature or keypoint vector for each detected feature or keypoint. As used herein, the term feature or keypoint vector includes any data structure such as a vector of values indicating characteristics of a particular feature (e.g., measures of various parameters characteristic of the features). For example, the keypoint location may be a pixel location of the feature (e.g., a top left pixel or center pixel of a feature) and the keypoint vector may include a feature vector of values indicative of or characteristic of the detected feature. In an embodiment, feature vectors having particular characteristics are reported as detected features. In an embodiment, keypoint data 125 indicates keypoints in equirectangular image 123 and keypoint data 125 indicates keypoints in equirectangular image 124. Notably, feature vectors of equirectangular images 123, 124 are used to identify matching features therebetween.

Figure 3:
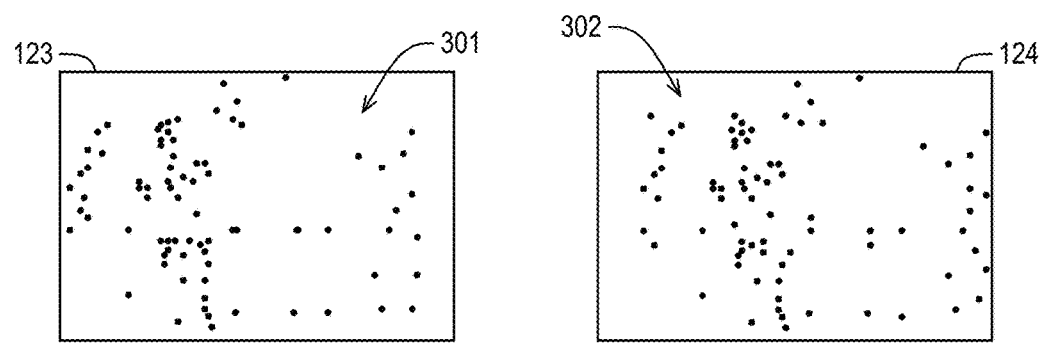
FIG. 3 illustrates example keypoints in example equirectangular images.

FIG. 3 illustrates example keypoints 301, 302 in example equirectangular images 123, 124, arranged in accordance with at least some implementations of the present disclosure. As shown, keypoints 301, 302, as indicated by keypoint data 125, 126 are detected at various locations in equirectangular images 123, 124. In FIG. 3, each of keypoints 301, 302 are indicated by dots representing pixel locations of keypoints 301, 302 in equirectangular images 123, 124, respectively. It is noted that keypoint data 125, 126, in addition to keypoint locations, may also include feature types for the keypoints, feature vector values for the keypoints, etc. such that keypoint data 125, 126 characterizes the location and image based characteristics (e.g., feature vectors) of each of keypoints 301, 302.

Returning to FIG. 1, keypoint data 125, 126 are provided to feature matching module 104, which performs feature matching between the features of keypoint data 125 (e.g., of equirectangular image 123) and the features of keypoint data 126 (e.g., of equirectangular image 124). The feature matching performed at feature matching module 104 may be characterized as global as the entirety of equirectangular images 123, 124 are available to determine matching features. Such feature mapping may be performed using any suitable technique or techniques. In an embodiment, feature mapping or matching is performed using a ratio test. In an embodiment, the ratio test includes finding a first nearest neighbor feature for a feature of equirectangular image 123 in equirectangular image 124 such that the nearest neighbor feature is the feature having the most similar feature vector to the feature vector of the feature being searched. For example, a search of features in equirectangular image 124 using a particular feature in equirectangular image 123 finds a closest match where the closest match is responsive to the smallest distance between the feature vectors of the features. The smallest distance for the first nearest neighbor is characterized as V1. Similarly, a second nearest neighbor feature in equirectangular image 124 is found for the particular feature in equirectangular image 123 using the same techniques. The distance for the second nearest neighbor is characterized as V2. The ratio test then indicates a match between features of equirectangular images 123, 124 only if V1/V2<gamma, where gamma is a threshold for the image based feature matching. That is, when the distance of the first nearest neighbor is less than a threshold gamma times the distance of the second nearest neighbor, a match is declared between the particular keypoint and its first nearest neighbor.

Notably, the threshold gamma implemented at feature matching module 104 (e.g., gamma1) may be a relatively low threshold gamma such that only high confidence matches are declared in set of matching keypoints 127 (matching keypoint set). That is, threshold gamma1 provides a tight image based matching similarity requirement for feature matching at feature matching module 104. Such a tight image based matching similarity requirement is contrasted with the image based matching similarity requirement of geometric and feature matching module 108 discussed herein below.

Furthermore, at matching enhancement module 105, the resultant matches from feature matching module 104 may undergo a symmetry test to ensure high quality matches and to further eliminate false positive matches. The symmetry test, as the name implies, requires, for a particular matching keypoint correspondence to be valid, both that a first keypoint of equirectangular image 123 finds an image based feature match to a second keypoint of equirectangular image 124 (as discussed using the ratio test) during a search of equirectangular image 124 and that the second keypoint finds an image based feature match to the first keypoint of the equirectangular image 123 during a search of equirectangular image 123. That is, the symmetry test requires that any matches passing the ratio test when searching equirectangular image 124 find the same match when the search is reversed (e.g., when equirectangular image 123 is searched) using for example the same ratio test. In an embodiment, the symmetry test applies the same ratio test discussed above with the same threshold gamma1.

Thereby, set of matching keypoints 127 include a subset of matches that are high confidences matches that have passed a ratio test with a tight image based matching similarity requirement and a symmetry test with the same image based matching similarity requirement. Such high confidence set of matching keypoints 127 are subsequently used to define a geometric constraint (e.g., a geometry aware matching) that is paired with image based matching using a less stringent similarity requirement (e.g., a larger threshold gamma). Thereby, a geometric constraint is advantageously applied early in the matching pipeline for improved performance.

As shown, set of matching keypoints 127 is received by spherical to world mapping module 106. Spherical to world mapping module 106 maps each keypoint of set of matching keypoints 127 to the world coordinate system. Each keypoint of set of matching keypoints 127 may be mapped to the world coordinate system (e.g., in 3D) using any suitable technique or techniques. The 3D points in the world coordinate system are then normalized and used to generate an essential matrix 128 representative of an epipolar geometry between the matching keypoints. Notably, unlike rectilinear perspective images, the coordinates of equirectangular images 123, 124 (as projections of fisheye images 121, 122) do not directly apply to an epipolar geometry constraint. Therefore, the coordinates of set of matching keypoints 127 across equirectangular images 123, 124 are mapped back to the world coordinate system and used to determine essential matrix 128, E. As discussed, essential matrix 128 is representative of an epipolar geometry between the matching keypoints. In an embodiment, essential matrix 128 defines, for any point in one of the images, in the world coordinate system, an epipolar line in the other image (e.g., it provides an epipolar constraint). In an embodiment, for each normalized world keypoint in the first image, $X_1$, and a corresponding normalized world keypoint in the first image, $X_2$, Equation (1) holds when the epipolar constraint is met:

$$X_1^T E X_2 = 0 \qquad (1)$$

where $X_1$ is the coordinates of a normalized world keypoint in a first image, E is the essential matrix, and $X_2$ is the coordinates of a normalized world keypoint in a second image. For example, given $X_1$ and $X_2$ are the normalized world coordinates, a best fit essential matrix 128 is determined using Equation (1).

Figure 4:
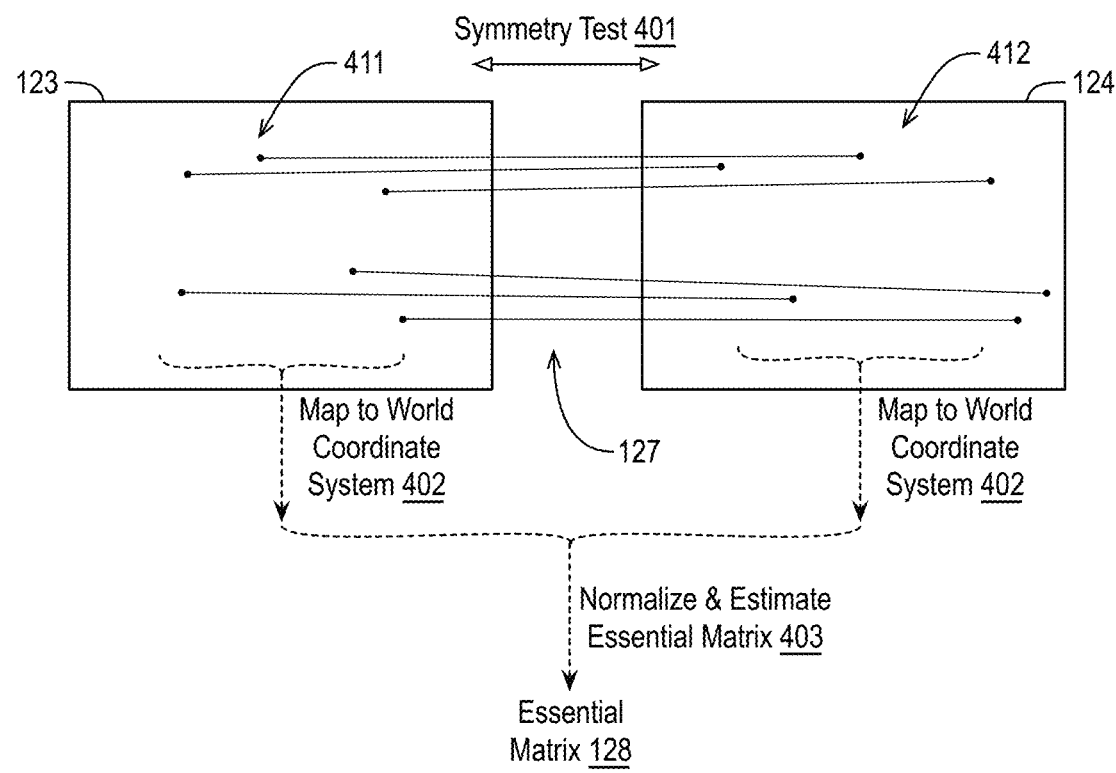
FIG. 4 illustrates an example set of matching keypoints and example generation of an example essential matrix.

FIG. 4 illustrates an example set of matching keypoints 127 and example generation of an example essential matrix 128, arranged in accordance with at least some implementations of the present disclosure. As shown, keypoints 411, 412 (e.g., subsets of keypoints 301, 302 that have found matches) are matched to provide set of matching keypoints 127 as indicated by lines connecting matching ones of keypoints 411, 412 from equirectangular images 123, 124, respectively. Notably, matching keypoints 127 are those keypoints that satisfied the image based feature matching as applied by feature matching module 104 (e.g., via ratio test) and a symmetry test 401, as discussed above with respect to feature matching module 104 and matching enhancement module 105.

As shown, keypoints 411, 412 are mapped to the world coordinate system via mapping operation 402. The resultant coordinates in the world coordinate system are normalized and used to estimate essential matrix 128 via normalization and estimation operation 403. Such normalization and estimation may be performed as discussed herein. In some embodiments, the essential matrix may be generated from the normalized corresponding points using a total least squares approximation to determine an essential matrix that is a closest fit to the normalized corresponding points.

Returning to FIG. 1, essential matrix 128 is provided to geometric and feature matching module 108, which also receives equirectangular images 123, 124. Geometric and feature matching module 108 applies both a geometric constraint as provided by essential matrix 128 and an image based feature matching test/constraint. That is, for matching keypoints to be declared by the geometric and feature matching module 108, the matching keypoints must meet both the geometric constraint/test and the image based feature matching constraint/test. In an embodiment, the geometric matching test applied by geometric and feature matching module 108 is a requirement that normalized world coordinates for the candidate matching keypoints meet the requirement of Equation (2):

$$X_1^T E X_2 < TH \quad (2)$$

where $X_1$ is representing the normalized world coordinates corresponding to the first keypoint in a first image, E is the essential matrix, $X_2$ is the normalized world coordinates corresponding to the second keypoint in a second image, and TH is a threshold. For example, given $X_1$ and $X_2$ are the normalized world coordinates for a pair of keypoints that are a match candidate, the geometric constraint is met if the essential matrix applied thereto is less than a threshold (and ideally is zero). The threshold, TH, may be any suitable value such as 1 pixel or ½ pixel.

As discussed, matching keypoints must also meet an image based feature matching test. In an embodiment, the image based feature mapping or matching is performed using a ratio test as discussed with respect to feature matching module 104. In an embodiment, the ratio test includes finding a first nearest neighbor feature and a second nearest neighbor feature for a feature of equirectangular image 123 in equirectangular image 124 such that the nearest neighbor feature is the feature having the most similar feature vector to the feature vector of the feature being searched and the second nearest neighbor feature is the feature having the second most similar feature vector to the feature vector of the feature being searched. As discussed, the smallest distance for the first nearest neighbor is characterized as V1 and the distance for the second nearest neighbor is characterized as V2. The ratio test then indicates an image based match between features of equirectangular images 123, 124 only if V1/V2<gamma2, where gamma2 is a threshold for the image based feature matching such that gamma2 is greater than gamma1 as discussed with respect to feature matching module 104.

Notably, the threshold gamma implemented at geometric and feature matching module 108 (e.g., gamma2) is a higher threshold gamma than gamma1 as implemented with respect to feature matching module 104. That is, threshold gamma2 provides a looser image based matching similarity requirement for feature matching at geometric and feature matching module 108 while the previously discussed geometric constraint must also be met. As discussed with respect to geometric and feature matching module 108, the geometric constraint is used to enhance feature matching in equirectangular images 123, 124 by limiting the ratio test (image based or visual similarity test) as applied using a looser threshold only to the set of matching points that are also in compliance with Equation 2 (e.g., a geometry test). Therefore, valid matches are only declared when both the image based or visual similarity test and geometry test are passed. Such techniques provide numerous high quality matches between equirectangular images 123, 124 with more true positives and fewer false positives.

Furthermore, at matching enhancement module 109, the resultant matches from feature matching module 108 may undergo a symmetry test to ensure high quality matches and to further eliminate false positive matches as discussed with respect to matching enhancement module 105. As discussed, the symmetry test requires, for a particular matching keypoint correspondence to be valid, both that a first keypoint of equirectangular image 123 finds a match to a second keypoint of equirectangular image 124 (using the ratio test as well as the geometry test) during a search of equirectangular image 124 and that the second keypoint finds a match to the first keypoint of the equirectangular image 123 during a search of equirectangular image 123.

Thereby, set of matching keypoints 129 are generated such that each matching pair of matching keypoints satisfies a geometric constraint as defined by the essential matrix, a visual similarity constraint as defined by the ratio test, and a symmetry test.

Figure 5:
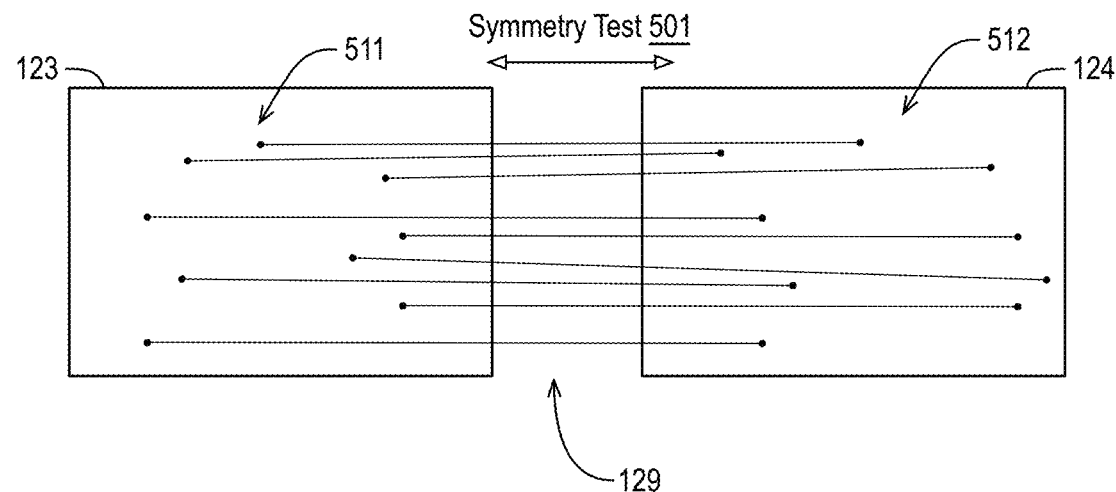
FIG. 5 illustrates an example set of matching keypoints between example equirectangular images.

FIG. 5 illustrates an example set of matching keypoints 129 between example equirectangular images 123, 124, arranged in accordance with at least some implementations of the present disclosure. As shown, keypoints 511, 512 (e.g., subsets of keypoints 301, 302) may be matched to provide set of matching keypoints 129 as indicated by lines connecting matching ones of keypoints 511, 512 from equirectangular images 123, 124, respectively. Notably, matching keypoints 129 are those keypoints that satisfied both the geometric test using the essential matrix and the image based feature matching as applied by geometric and feature matching module 108 (e.g., via ratio test) and a symmetry test 501, as applied by matching enhancement module 109.

Returning to FIG. 1, set of matching keypoints 129 are provided to keypoint detection and matching using local search module 110, which generates local patches around some or all of the keypoints in set of matching keypoints 129 and performs a local search, only within the local patches, for additional keypoint matches using the ratio and symmetry tests discussed herein.

Figure 6:
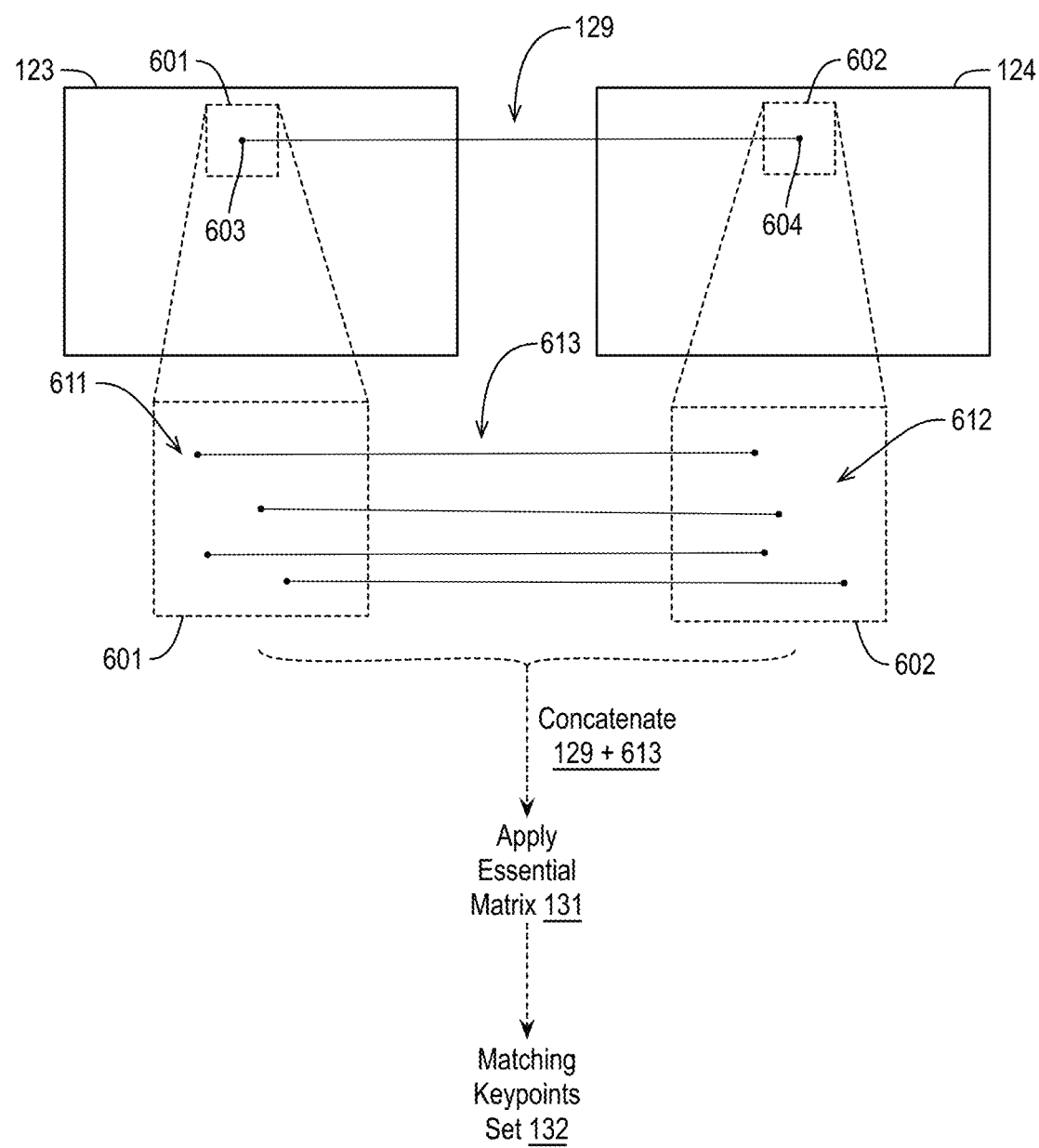
FIG. 6 illustrates an example local searching around matched keypoints and example generation of an enhanced set of matching keypoints.

FIG. 6 illustrates an example local searching around matched keypoints 129 and example generation of an enhanced set of matching keypoints 132, arranged in accordance with at least some implementations of the present disclosure. As shown, for a keypoint 603 of equirectangular image 123 and a corresponding matched keypoint 604 of equirectangular image 124 (from set of matching keypoints 129), a first patch 601 around keypoint 603 and a second patch 602 around keypoint 604 are defined. Notably, the discussed techniques may be applied to some or all keypoints of set of matching keypoints 129. A single matching set is illustrated for the sake of clarity.

First patch 601 and second patch 602 may have any suitable sizes and shapes. In an embodiment, first patch 601 and second patch 602 are of the same predefined size such as a particular pixel patch size (e.g., 100×100 pixels, 200×200 pixels, etc.). In some embodiments, the sizes of first patch 601 and second patch 602 are determined based on the scale associated to the features corresponding to the matched keypoints 603, 604. In an embodiment, a larger patch size for first patch 601 and second patch 602 is defined to allow for the detection of larger number of matched features.

First patch 601 and second patch 602 are searched for additional keypoint matches using the ratio test and symmetry test discussed herein only within first patch 601 and second patch 602. In an embodiment, feature mapping or matching is performed only within first patch 601 and second patch 602 using a ratio test, which, as discussed, includes finding first and second nearest neighbor features for a search feature such that the nearest neighbor feature is the feature having the most similar feature vector to the feature vector of the feature being searched and the second nearest neighbor feature is the feature having the second most similar feature vector to the feature vector of the feature being searched (e.g., as measured by distance between the vectors). The smallest distance for the first nearest neighbor is characterized as V1 and the distance for the second nearest neighbor is characterized as V2 with the ratio test indicating a match between features if V1/V2<gamma, where gamma is a threshold for the image based feature matching. In an embodiment, the implemented gamma is gamma2 discussed herein. In some embodiments, the implemented gamma is gamma3 such that gamma3 is larger than gamma2. Furthermore, in some embodiments, each match must meet a symmetry test as discussed herein.

As shown, by further local searching within first patch 601 and second patch 602, additional matching keypoints as provided by set of matching keypoints 613 are identified. As shown, set of matching keypoints 613 indicate matches between keypoints 611 of first patch 601 and keypoints 612 of second patch 602. With reference to FIG. 1 and as shown in FIG. 6, set of matching keypoints 613 and set of matching keypoints 129 are concatenated (e.g., merged or combined) at concatenation module 111 to generate a set of matching keypoints 130 including all matches of set of matching keypoints 613 and set of matching keypoints 129.

Furthermore, set of matching keypoints 129 is received by spherical to world mapping module 112, which maps each keypoint of set of matching keypoints 129 to the world coordinate system. The 3D points in the world coordinate system are then normalized and used to generate an essential matrix 131 by essential matrix prediction module 113 such that essential matrix 131 is representative of an epipolar geometry between the matching keypoints as discussed above with respect to essential matrix 128. For example, given $X_1$ and $X_2$ are normalized world coordinates corresponding to the matching keypoints 129, a best fit essential matrix 128 is determined using Equation (1) as discussed above.

Set of matching keypoints 130 and essential matrix 131 are received by geometric constraint module 114, which applies the geometric constraint of essential matrix 131 to set of matching keypoints 130. Notably, any matching keypoints that do not satisfy Equation (2) are discarded. Such application of the geometric constraint may be performed using any suitable technique or techniques such as those discussed herein with respect to geometric and feature matching module 108. For example, the geometric constraint applied by module 114 may require that normalized world coordinates for the candidate matching keypoints meet the requirement of Equation (2) discussed above, where the applied threshold may be the same or different. For example, given $X_1$ and $X_2$ are representing the normalized world coordinates corresponding to a particular pair of matching keypoints 130, the geometric constraint is met if essential matrix 131 as applied thereto is less than a threshold (and ideally is zero). Notably, any keypoint matches that do not meet the geometric test are discarded from set of matching keypoints 130 to generate set of matching keypoints 132.

With reference to FIG. 6, as shown, essential matrix 131 is applied to set of matching keypoints 130 (i.e., the concatenation of set of matching keypoints 129 and set of matching keypoints 613) to generate set of matching keypoints 132. As discussed, set of matching keypoints 132, as matches are discarded from the concatenation of set of matching keypoints 129 and set of matching keypoints 613 due to them not meeting the geometric requirement of essential matrix 131, are typically a subset of the concatenation of set of matching keypoints 129 and set of matching keypoints 613.

Returning to FIG. 1, set of matching keypoints 132 are provided to spherical to fisheye mapping module 115, which maps each of keypoint of set of matching keypoints 132 from the equirectangular image plane of equirectangular images 123, 124 to the image plane of fisheye images 121, 122 to generate set of matching keypoints 133. The mapping from the equirectangular image plane to the fisheye image plane may be performed using any suitable technique or techniques such as the inverse of the spherical projection discussed with respect to spherical projection module 102.

Set of matching keypoints 133 thereby includes locations, within fisheye images 121, 122, that are deemed to indicate matching keypoints therebetween. Set of matching keypoints 133 may include any data structure that indicates corresponding features or points (e.g., keypoint pixel locations of matched features or points) between fisheye images 121, 122 such as corresponding pixel locations and, optionally, the type or characteristics of the matched feature. As discussed, set of matching keypoints 133 may be used in a variety of image processing and/or computer vision contexts that utilize fisheye images such as dynamic calibration, image stitching, view interpolation, structure from motion, etc.

Figure 7:
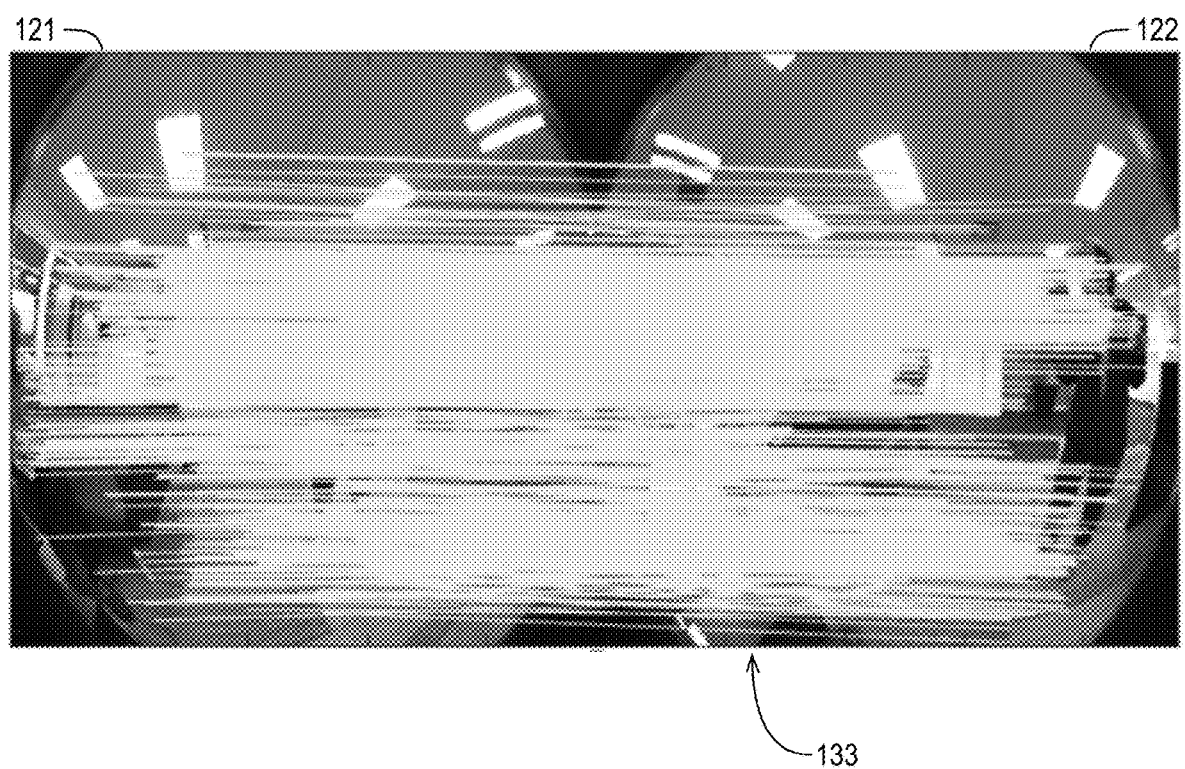
FIG. 7 illustrates an example set of matching keypoints between example fisheye images.

FIG. 7 illustrates an example set of matching keypoints 133 between example fisheye images 121, 122, arranged in accordance with at least some implementations of the present disclosure. As shown, using the techniques discussed herein, a substantial number of matched keypoints are generated. In FIG. 7, each match of set of matching keypoints 133 is indicated by a line connecting the keypoints.

Notably, compared to traditional techniques, the techniques discussed herein provide more matches with greater precision (whether the match is a true match). In some examples, the number of matches using the discussed techniques include about 3× the number of matches with 50% improved precision.

Figure 8:
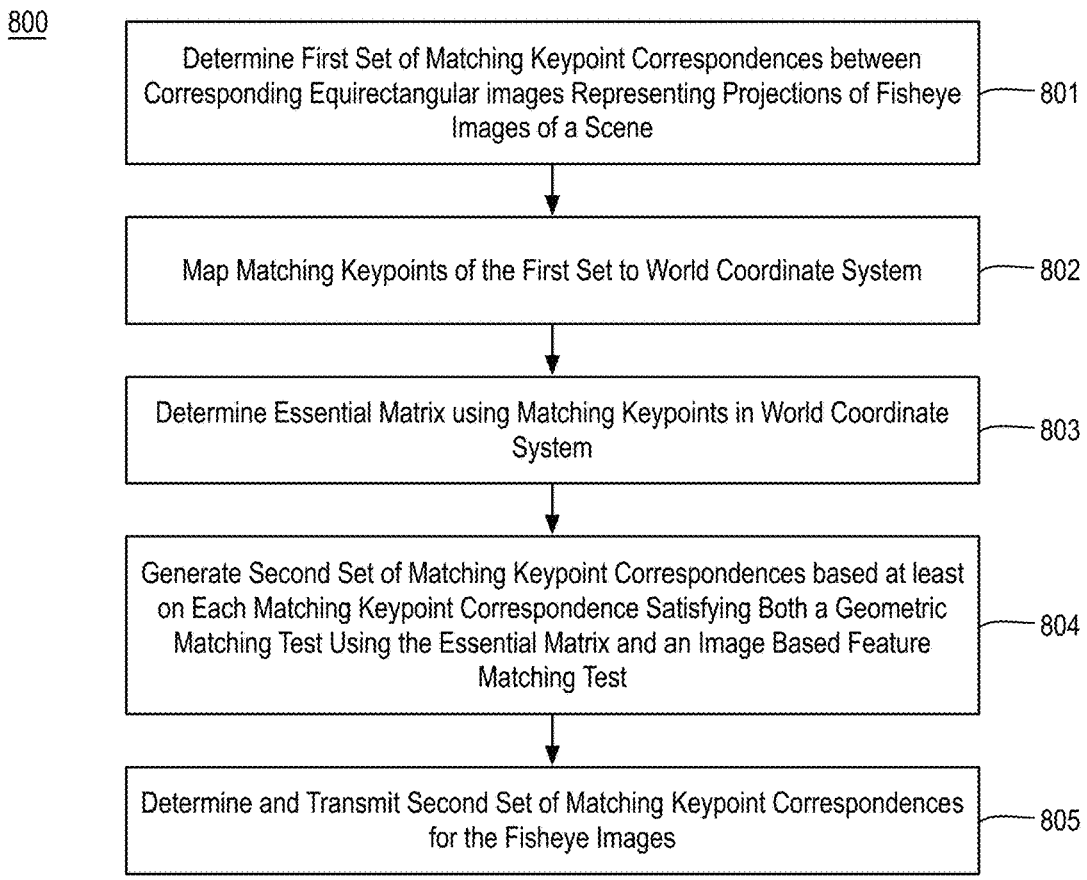
FIG. 8 is a flow diagram illustrating an example process for keypoint detection and matching in fisheye images.

FIG. 8 is a flow diagram illustrating an example process 800 for keypoint detection and matching in fisheye images, arranged in accordance with at least some implementations of the present disclosure. Process 800 may include one or more operations 801-805 as illustrated in FIG. 8. Process 800 may form at least part of a keypoint detection and matching process for fisheye images. By way of non-limiting example, process 800 may form at least part of a keypoint detection and matching process for fisheye images performed by system 900 as discussed herein. Furthermore, process 800 will be described herein with reference to system 900 of FIG. 9.

Figure 9:
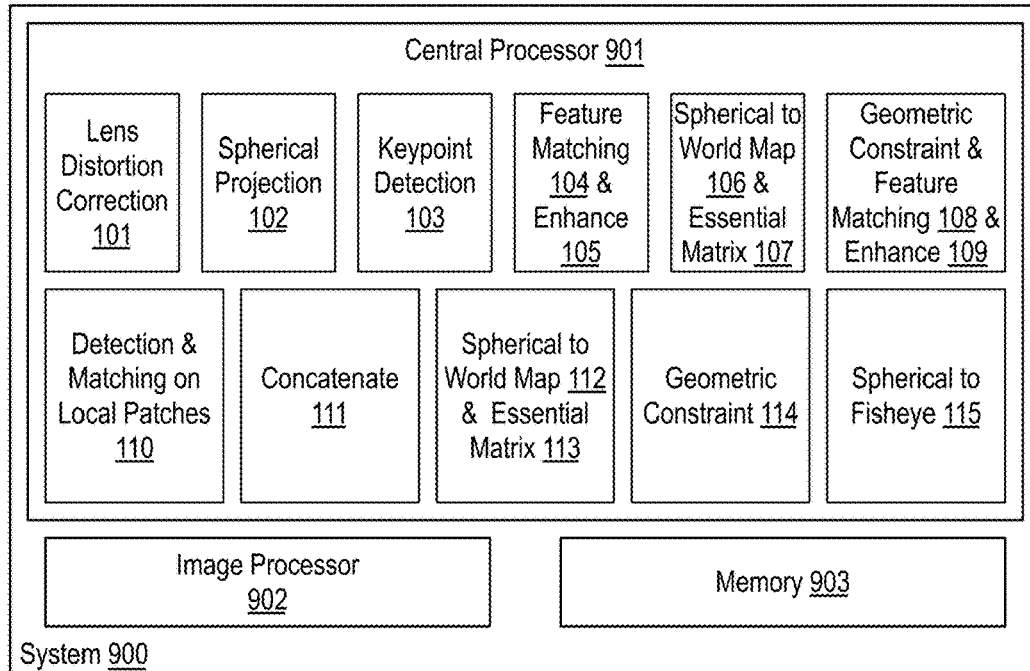
FIG. 9 is an illustrative diagram of an example system for keypoint detection and matching in fisheye images.

FIG. 9 is an illustrative diagram of an example system 900 for keypoint detection and matching in fisheye images, arranged in accordance with at least some implementations of the present disclosure. As shown in FIG. 9, system 900 may include a central processor 901, an image processor 902, and a memory 903. Also as shown, central processor 901 may include or implement lens distortion correction module 101, spherical projection module 102, keypoint detection module 103, feature matching module 104 and a matching enhancement module 105, spherical to world mapping module 106 and essential matrix prediction module 107, geometric and feature matching module 108 and matching enhancement module 109 keypoint detection and matching using local search module 110, concatenation module 111, spherical to world mapping module 112 and essential matrix prediction module 113, geometric constraint module 114, and spherical to fisheye mapping module 115. The groupings of such modules in FIG. 9 are illustrative of an example embodiment but are not meant to be limiting.

Such components or modules may be implemented to perform operations as discussed herein. Memory 903 may store fisheye images, equirectangular images, detected features, feature vectors, matched features, keypoints, matched keypoints, sets of matched keypoints, or any other data discussed herein. As shown, in some examples, lens distortion correction module 101, spherical projection module 102, keypoint detection module 103, feature matching module 104 and a matching enhancement module 105, spherical to world mapping module 106 and essential matrix prediction module 107, geometric and feature matching module 108 and matching enhancement module 109 keypoint detection and matching using local search module 110, concatenation module 111, spherical to world mapping module 112 and essential matrix prediction module 113, geometric constraint module 114, and spherical to fisheye mapping module 115 are implemented via central processor 901. In other examples, one or more or portions of lens distortion correction module 101, spherical projection module 102, keypoint detection module 103, feature matching module 104 and a matching enhancement module 105, spherical to world mapping module 106 and essential matrix prediction module 107, geometric and feature matching module 108 and matching enhancement module 109 keypoint detection and matching using local search module 110, concatenation module 111, spherical to world mapping module 112 and essential matrix prediction module 113, geometric constraint module 114, and spherical to fisheye mapping module 115 are implemented via image processor 901, a video processor, a graphics processor, or the like. In yet other examples, one or more or portions of lens distortion correction module 101, spherical projection module 102, keypoint detection module 103, feature matching module 104 and a matching enhancement module 105, spherical to world mapping module 106 and essential matrix prediction module 107, geometric and feature matching module 108 and matching enhancement module 109 keypoint detection and matching using local search module 110, concatenation module 111, spherical to world mapping module 112 and essential matrix prediction module 113, geometric constraint module 114, and spherical to fisheye mapping module 115 are implemented via an image or video processing pipeline or unit.

Image processor 902 may include any number and type of graphics, image, or video processing units that may provide the operations as discussed herein. In some examples, image processor 902 may be an image signal processor. Such operations may be implemented via software or hardware or a combination thereof. For example, image processor 902 may include circuitry dedicated to manipulate image data or video data obtained from memory 903. Central processor 901 may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory.

In an embodiment, one or more or portions of lens distortion correction module 101, spherical projection module 102, keypoint detection module 103, feature matching module 104 and a matching enhancement module 105, spherical to world mapping module 106 and essential matrix prediction module 107, geometric and feature matching module 108 and matching enhancement module 109 keypoint detection and matching using local search module 110, concatenation module 111, spherical to world mapping module 112 and essential matrix prediction module 113, geometric constraint module 114, and spherical to fisheye mapping module 115 are implemented via an execution unit (EU) of image processor 902. The EU may include, for example, programmable logic or circuitry such as a logic core or cores that may provide a wide array of programmable logic functions. In an embodiment, one or more or portions of lens distortion correction module 101, spherical projection module 102, keypoint detection module 103, feature matching module 104 and a matching enhancement module 105, spherical to world mapping module 106 and essential matrix prediction module 107, geometric and feature matching module 108 and matching enhancement module 109 keypoint detection and matching using local search module 110, concatenation module 111, spherical to world mapping module 112 and essential matrix prediction module 113, geometric constraint module 114, and spherical to fisheye mapping module 115 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of lens distortion correction module 101, spherical projection module 102, keypoint detection module 103, feature matching module 104 and a matching enhancement module 105, spherical to world mapping module 106 and essential matrix prediction module 107, geometric and feature matching module 108 and matching enhancement module 109 keypoint detection and matching using local search module 110, concatenation module 111, spherical to world mapping module 112 and essential matrix prediction module 113, and geometric constraint module 114, and spherical to fisheye mapping module 115 are implemented via an application specific integrated circuit (ASIC). The ASIC may include an integrated circuitry customized to perform the operations discussed herein.

Returning to discussion of FIG. 8, process 800 begins at operation 801, where a first set of matching keypoint correspondences are determined between corresponding first and second equirectangular images such that the first and second equirectangular images represent projections from first and second fisheye images, respectively, of a scene. In an embodiment, the projections from the first and second fisheye images of the scene to the equirectangular images is a spherical projection. In an embodiment, the first and second fisheye images are lens distortion corrected and spherically projected to generate the first and second equirectangular images.

Processing continues at operation 802, where matching keypoints of the first set are mapped to a world coordinate system corresponding to the scene. The matching keypoints may be mapped to the world coordinate system using any suitable technique or techniques. Processing continues at operation 803, where an essential matrix is determined using the matching keypoints of the first set in the world coordinate system such that the essential matrix is representative of an epipolar geometry between the matching keypoints. The essential matrix may be estimated or determined using any suitable technique or techniques such as those discussed with respect to Equation (1).

Processing continues at operation 804, where a second set of matching keypoint correspondences are determined between the corresponding pair of equirectangular images based at least on each matching keypoint correspondence of the second set satisfying both a geometric matching test using the essential matrix and an image based feature matching test. The geometric matching test may provide an epipolar geometry relationship between all matched keypoints and the image based feature matching test may provide a feature matching constraint. In an embodiment, determining the first set of matching keypoint correspondences (at operation 801) includes applying a first image based feature matching test using a first threshold and the image based feature matching test (at operation 804) is a second image based feature matching test applying a second threshold such that the first threshold provides for a tighter image based matching similarity requirement than the second threshold. In an embodiment, the first image based feature matching test (at operation 801) includes a first ratio test having a requirement that, for a particular matching keypoint correspondence, a first ratio of a nearest neighbor feature vector distance for the particular matching keypoint correspondence to a second nearest neighbor feature vector distance for another matching keypoint correspondence must be less than the first threshold, and the second image based feature matching test (at operation 804) includes a second ratio test comprising a requirement that, for a second particular matching keypoint correspondence, a second ratio of a nearest neighbor feature vector distance for the second particular matching keypoint correspondence to another second matching keypoint correspondence must be less than the second threshold such that the first threshold is less than the second threshold.

In an embodiment, each matching keypoint correspondence of the second set must further satisfy a symmetry test, the symmetry test requiring, for a particular matching keypoint correspondence, that a first keypoint of the first equirectangular image finds an image based feature match to a second keypoint of the second equirectangular image during a search of the second equirectangular image and that the second keypoint finds an image based feature match to the first keypoint of the first equirectangular image during a search of the first equirectangular image.

In an embodiment, generating the second set of matching keypoint correspondences includes generating a third set of matching keypoint correspondences using the geometric matching test and the image based feature matching test, mapping matching keypoints of the third set to the world coordinate system, determining a second essential matrix using the matching keypoints of the third set in the world coordinate system, generating a fourth set of matching keypoint correspondences between the first and second equirectangular images based on local searching of the third set of matching keypoint correspondences such that the local searching comprises a second geometric matching test using the essential matrix and a second image based feature matching test, and combining the third and fourth sets of matching keypoint correspondences to generate the second set of matching keypoint correspondences. In an embodiment, the local searching searches for matching keypoint correspondences within only a first image patch surrounding a first matching keypoint of the first equirectangular image and within only a second image patch surrounding a second matching keypoint of the second equirectangular image. In an embodiment, the second image based feature matching test includes a ratio test comprising a requirement that, for a matching keypoint correspondence, a ratio of a nearest neighbor feature vector distance between a first feature point within the first image patch and a second feature point within the second image patch to a second nearest neighbor feature vector distance between the first feature point and a third feature point within the second image patch must be less than a threshold. In an embodiment, the local searching further includes a symmetry test, the symmetry test requiring, for the matching keypoint correspondence, a second ratio of a second nearest neighbor feature vector distance between the first feature point within the first image patch and the second feature point within the second image patch to a third nearest neighbor feature vector distance between the second feature point and a fourth feature point within the first image patch must be less than the threshold. In an embodiment, a size of the first image patch is based on one of a feature size of a matched feature of the first matching keypoint or a feature location of the first matching keypoint.

Processing continues at operation 805, where a final set of matching keypoint correspondences are determined and transmitted for the first and second fisheye images based on the second set. In an embodiment, the final set of matching keypoint correspondences include a set of matching keypoint correspondences mapped to the fisheye images from the second set of matching keypoint correspondences between the corresponding pair of equirectangular images. The set of matching keypoint correspondences may be transmitted for use by another application within the same device or system, transmitted for storage in memory at the same or a different device or system, or transmitted for use by a different device or system.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures. For example, the systems discussed herein may include additional components such as image pre-processing circuitry, memory controllers, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any operation discussed herein or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
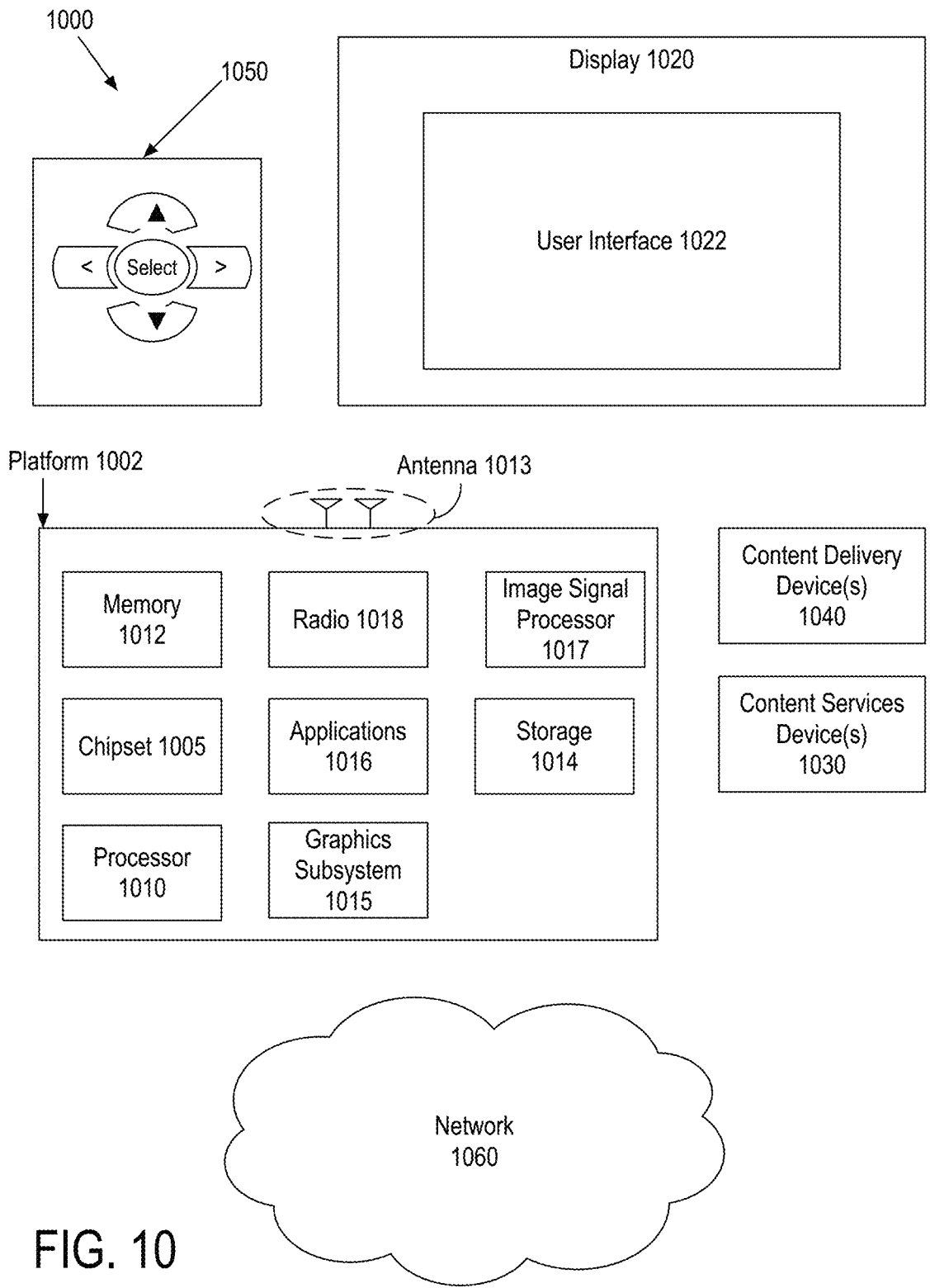
FIG. 10 is an illustrative diagram of an example system.

FIG. 10 is an illustrative diagram of an example system 1000, arranged in accordance with at least some implementations of the present disclosure. In various implementations, system 1000 may be a computing system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (e.g., smart watch or smart glasses), mobile internet device (MID), messaging device, data communication device, peripheral device, scanner, printer, multi-function device, and so forth.

In various implementations, system 1000 includes a platform 1002 coupled to a display 1020. Platform 1002 may receive content from a content device such as content services device(s) 1030 or content delivery device(s) 1040. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016, image signal processor 1017 and/or radio 1018. Chipset 1005 may provide intercommunication among processor 1010, memory 1012, storage 1014, graphics subsystem 1015, applications 1016, image signal processor 1017 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Image signal processor 1017 may be implemented as a specialized digital signal processor or the like used for image processing. In some examples, image signal processor 1017 may be implemented based on a single instruction multiple data or multiple instruction multiple data architecture or the like. In some examples, image signal processor 1017 may be characterized as a media processor. As discussed herein, image signal processor 1017 may be implemented based on a system on a chip architecture and/or based on a multi-core architecture.

Graphics subsystem 1015 may perform processing of images such as still or video for display. Graphics subsystem 1015 may be a graphics processing unit (GPU), a visual processing unit (VPU), or an image processing unit, for example. In some examples, graphics subsystem 1015 may perform scanned image rendering as discussed herein. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or image processor and/or application specific integrated circuit may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any flat panel monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
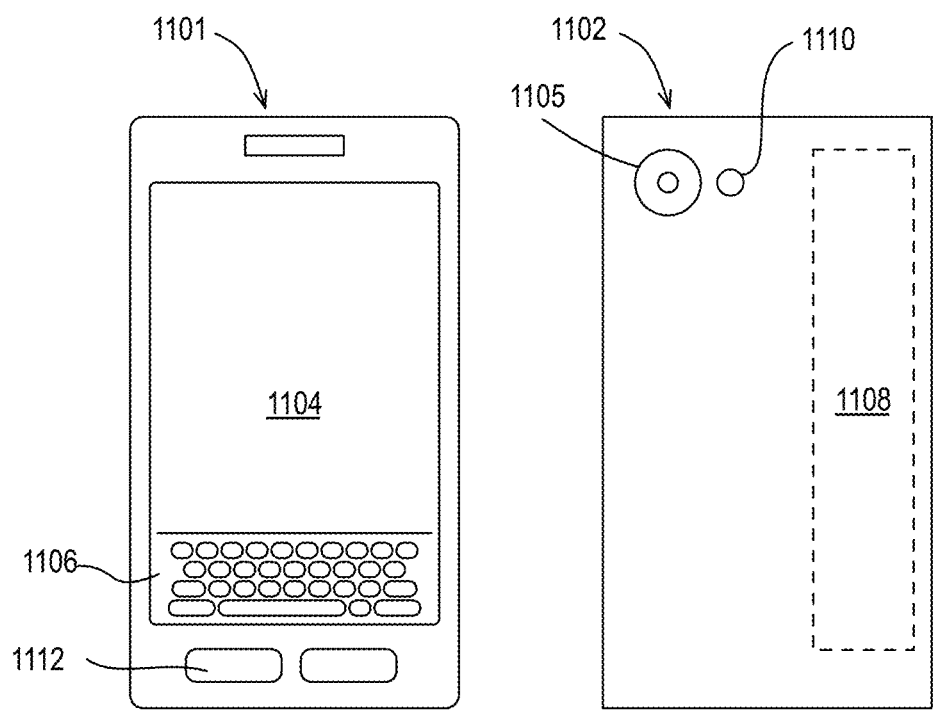
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, other devices or systems, or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for keypoint detection and matching in fisheye images comprising:
   a memory configured to store first and second fisheye images; and
   one or more processors coupled to the memory, the one or more processors to:

determine a first set of matching keypoint correspondences between corresponding first and second equirectangular images, wherein the first and second equirectangular images represent projections from the first and second fisheye images, respectively, of a scene;

map matching keypoints of the first set to a world coordinate system corresponding to the scene;

determine an essential matrix using the matching keypoints of the first set in the world coordinate system, wherein the essential matrix is representative of an epipolar geometry between the matching keypoints;

generate a second set of matching keypoint correspondences between the corresponding first and second equirectangular images based at least on each matching keypoint correspondence of the second set satisfying both a geometric matching test using the essential matrix and an image based feature matching test; and determine and transmit a final set of matching keypoint correspondences for the first and second fisheye images based on the second set.

2. The system of claim 1, wherein the one or more processors to determine the first set of matching keypoint correspondences comprises the one or more processors to apply a first image based feature matching test using a first threshold, said image based feature matching test comprises a second image based feature matching test applying a second threshold, and the first threshold provides for a tighter image based matching similarity requirement than the second threshold.

3. The system of claim 2, wherein the first image based feature matching test comprises a first ratio test having a requirement that, for a particular matching keypoint correspondence, a first ratio of a nearest neighbor feature vector distance for the particular matching keypoint correspondence to a second nearest neighbor feature vector distance for another matching keypoint correspondence must be less than the first threshold, and the second image based feature matching test comprises a second ratio test comprising a requirement that, for a second particular matching keypoint correspondence, a second ratio of a nearest neighbor feature vector distance for the second particular matching keypoint correspondence to another second matching keypoint correspondence must be less than the second threshold, wherein the first threshold is less than the second threshold.

4. The system of claim 1, wherein each matching keypoint correspondence of the second set must further satisfy a symmetry test, the symmetry test requiring, for a particular matching keypoint correspondence, that a first keypoint of the first equirectangular image finds an image based feature match to a second keypoint of the second equirectangular image during a search of the second equirectangular image and that the second keypoint finds an image based feature match to the first keypoint of the first equirectangular image during a search of the first equirectangular image.

5. The system of claim 1, wherein the one or more processors to generate the second set of matching keypoint correspondences comprises the one or more processors to:

generate a third set of matching keypoint correspondences using the geometric matching test and the image based feature matching test;

map matching keypoints of the third set to the world coordinate system;

determine a second essential matrix using the matching keypoints of the third set in the world coordinate system;

generate a fourth set of matching keypoint correspondences between the first and second equirectangular images based on local searching of the third set of matching keypoint correspondences, wherein the local searching comprises a second geometric matching test using the essential matrix and a second image based feature matching test; and combine the third and fourth sets of matching keypoint correspondences to generate the second set of matching keypoint correspondences.

6. The system of claim 5, wherein the local searching searches for matching keypoint correspondences within only a first image patch surrounding a first matching keypoint of the first equirectangular image and within only a second image patch surrounding a second matching keypoint of the second equirectangular image.

7. The system of claim 6, wherein the second image based feature matching test comprises a ratio test comprising a requirement that, for a matching keypoint correspondence, a ratio of a nearest neighbor feature vector distance between a first feature point within the first image patch and a second feature point within the second image patch to a second nearest neighbor feature vector distance between the first feature point and a third feature point within the second image patch must be less than a threshold.

8. The system of claim 7, wherein the local searching further comprises a symmetry test, the symmetry test requiring, for the matching keypoint correspondence, a second ratio of a second nearest neighbor feature vector distance between the first feature point within the first image patch and the second feature point within the second image patch to a third nearest neighbor feature vector distance between the second feature point and a fourth feature point within the first image patch must be less than the threshold.

9. The system of claim 6, wherein a size of the first image patch is based on a scale of a matched feature of the first matching keypoint or a feature location of the first matching keypoint.

10. The system of claim 1, wherein the projections from the first and second fisheye images of the scene to the equirectangular images comprise a spherical projection and the method further comprises, prior to said transmitting, mapping the second set of matching keypoint correspondences to the first and second fisheye images.

11. A method for keypoint detection and matching in fisheye images comprising:

determining a first set of matching keypoint correspondences between corresponding first and second equirectangular images, wherein the first and second equirectangular images represent projections from first and second fisheye images, respectively, of a scene;

mapping matching keypoints of the first set to a world coordinate system corresponding to the scene;

determining an essential matrix using the matching keypoints of the first set in the world coordinate system, wherein the essential matrix is representative of an epipolar geometry between the matching keypoints;

generating a second set of matching keypoint correspondences between the corresponding first and second equirectangular images based at least on each matching keypoint correspondence of the second set satisfying both a geometric matching test using the essential matrix and an image based feature matching test; and determining and transmitting a final set of matching keypoint correspondences for the first and second fisheye images based on the second set.

12. The method of claim 11, wherein determining the first set of matching keypoint correspondences comprises applying a first image based feature matching test using a first threshold, said image based feature matching test comprises a second image based feature matching test applying a second threshold, and the first threshold provides for a tighter image based matching similarity requirement than the second threshold.

13. The method of claim 12, wherein the first image based feature matching test comprises a first ratio test having a requirement that, for a particular matching keypoint correspondence, a first ratio of a nearest neighbor feature vector distance for the particular matching keypoint correspondence to a second nearest neighbor feature vector distance for another matching keypoint correspondence must be less than the first threshold, and the second image based feature matching test comprises a second ratio test comprising a requirement that, for a second particular matching keypoint correspondence, a second ratio of a nearest neighbor feature vector distance for the second particular matching keypoint correspondence to another second matching keypoint correspondence must be less than the second threshold, wherein the first threshold is less than the second threshold.

14. The method of claim 11, wherein generating the second set of matching keypoint correspondences comprises:
generating a third set of matching keypoint correspondences using the geometric matching test and the image based feature matching test;
mapping matching keypoints of the third set to the world coordinate system;
determining a second essential matrix using the matching keypoints of the third set in the world coordinate system;
generating a fourth set of matching keypoint correspondences between the first and second equirectangular images based on local searching of the third set of matching keypoint correspondences, wherein the local searching comprises a second geometric matching test using the essential matrix and a second image based feature matching test; and
combining the third and fourth sets of matching keypoint correspondences to generate the second set of matching keypoint correspondences.

15. The method of claim 14, wherein the local searching searches for matching keypoint correspondences within only a first image patch surrounding a first matching keypoint of the first equirectangular image and within only a second image patch surrounding a second matching keypoint of the second equirectangular image, and wherein the second image based feature matching test comprises a ratio test comprising a requirement that, for a matching keypoint correspondence, a ratio of a nearest neighbor feature vector distance between a first feature point within the first image patch and a second feature point within the second image patch to a second nearest neighbor feature vector distance between the first feature point and a third feature point within the second image patch must be less than a threshold.

16. The method of claim 15, wherein a size of the first image patch is based on one of a feature size of a matched feature of the first matching keypoint or a feature location of the first matching keypoint.

17. At least one non-transitory machine readable medium comprising a plurality of instructions that, in response to being executed on a device, cause the device to perform keypoint detection and matching in fisheye images by:
determining a first set of matching keypoint correspondences between corresponding first and second equirectangular images, wherein the first and second equirectangular images represent projections from first and second fisheye images, respectively, of a scene;
mapping matching keypoints of the first set to a world coordinate system corresponding to the scene;
determining an essential matrix using the matching keypoints of the first set in the world coordinate system, wherein the essential matrix is representative of an epipolar geometry between the matching keypoints;
generating a second set of matching keypoint correspondences between the corresponding first and second equirectangular images based at least on each matching keypoint correspondence of the second set satisfying both a geometric matching test using the essential matrix and an image based feature matching test; and
determining and transmitting a final set of matching keypoint correspondences for the first and second fisheye images based on the second set.

18. The non-transitory machine readable medium of claim 17, wherein determining the first set of matching keypoint correspondences comprises applying a first image based feature matching test using a first threshold, said image based feature matching test comprises a second image based feature matching test applying a second threshold, and the first threshold provides for a tighter image based matching similarity requirement than the second threshold.

19. The non-transitory machine readable medium of claim 18, wherein the first image based feature matching test comprises a first ratio test having a requirement that, for a particular matching keypoint correspondence, a first ratio of a nearest neighbor feature vector distance for the particular matching keypoint correspondence to a second nearest neighbor feature vector distance for another matching keypoint correspondence must be less than the first threshold, and the second image based feature matching test comprises a second ratio test comprising a requirement that, for a second particular matching keypoint correspondence, a second ratio of a nearest neighbor feature vector distance for the second particular matching keypoint correspondence to another second matching keypoint correspondence must be less than the second threshold, wherein the first threshold is less than the second threshold.

20. The non-transitory machine readable medium of claim 17, wherein generating the second set of matching keypoint correspondences comprises:
generating a third set of matching keypoint correspondences using the geometric matching test and the image based feature matching test;
mapping matching keypoints of the third set to the world coordinate system;
determining a second essential matrix using the matching keypoints of the third set in the world coordinate system;
generating a fourth set of matching keypoint correspondences between the first and second equirectangular images based on local searching of the third set of matching keypoint correspondences, wherein the local searching comprises a second geometric matching test using the essential matrix and a second image based feature matching test; and
combining the third and fourth sets of matching keypoint correspondences to generate the second set of matching keypoint correspondences.

21. The non-transitory machine readable medium of claim 20, wherein the local searching searches for matching keypoint correspondences within only a first image patch surrounding a first matching keypoint of the first equirectangular image and within only a second image patch surrounding a second matching keypoint of the second equirectangular image, and wherein the second image based feature matching test comprises a ratio test comprising a requirement that, for a matching keypoint correspondence, a ratio of a nearest neighbor feature vector distance between a first feature point within the first image patch and a second feature point within the second image patch to a second nearest neighbor feature vector distance between the first feature point and a third feature point within the second image patch must be less than a threshold.

22. The non-transitory machine readable medium of claim 21, wherein a size of the first image patch is based on a scale of a matched feature of the first matching keypoint or a feature location of the first matching keypoint.

* * * * *